United States Patent [19]

Kotani et al.

[11] Patent Number: 5,381,205
[45] Date of Patent: Jan. 10, 1995

[54] PARALLAX CORRECTING APPARATUS IN A CAMERA

[75] Inventors: Noriyasu Kotani, Tokyo; Hiroshi Wakabayashi, Yokohama, both of Japan

[73] Assignee: Nikon Corporation, Tokyo, Japan

[21] Appl. No.: 80,239

[22] Filed: Jun. 23, 1993

[30] Foreign Application Priority Data

Jul. 24, 1992 [JP] Japan .................. 4-198450

[51] Int. Cl.⁶ .............................. G03B 13/14
[52] U.S. Cl. ...................... 354/400; 354/199; 354/221
[58] Field of Search ............ 354/400, 402, 409, 195.1, 354/195.13, 199, 221, 164, 166, 403

[56] References Cited

U.S. PATENT DOCUMENTS

| | | | |
|---|---|---|---|
| 4,182,555 | 1/1980 | Imura et al. | 354/402 |
| 4,300,823 | 11/1981 | Yamanaka et al. | 354/403 |
| 4,478,493 | 10/1984 | Yokota | 354/221 X |
| 4,697,901 | 10/1987 | Wakabayashi et al. | 354/221 |

FOREIGN PATENT DOCUMENTS 3-83030  4/1991  Japan .

*Primary Examiner*—W. B. Perkey
*Attorney, Agent, or Firm*—Shapiro and Shapiro

[57] ABSTRACT

A parallax correcting apparatus in a camera provided with an auto focus mode in which a photo-taking lens is automatically driven on the basis of the result of distance measurement to thereby effect focus adjustment and a manual focus mode in which a photographing distance is manually set by the operation of a manually operated member and the photo-taking lens is driven on the basis of the photographing distance comprises a display device for displaying the photographing range, and a parallax correcting device for changing the display of the photographing range on the basis of the photographing distance. During the auto focus mode, the parallax correcting device changes the display of the photographing range in operative association with the driving of the photo-taking lens, and during the manual focus mode, the parallax correcting device changes the display of the photographing range in operative association with the operation of the manually operated member independently of the driving of the photo-taking lens.

6 Claims, 7 Drawing Sheets

PARALLAX CORRECTING APPARATUS IN A CAMERA

BACKGROUND OF THE INVENTION

1. Field of the Invention

This invention relates to a parallax correcting apparatus in a camera for changing the display of a photographing range in conformity with a photographing distance.

2. Related Background Art

Generally, in the other cameras than single-lens reflex cameras and focusing screen type cameras, it is known that a deviation between the optical axes of a photographing optical system and a finder optical system results in the creation of a deviation between a phototaking lens field and a finder field, i.e., a parallax.

This parallax appears more remarkably as the photographing distance becomes shorter and therefore, particularly in close-up photographing or the like, it is desirable to correct the parallax in order to obtain an accurate photographing field.

On the other hand, as a camera provided with a parallax correcting apparatus for correcting a parallax, there is known a camera provided with an auto focus mode in which a photo-taking lens is automatically driven on the basis of the result of distance measurement to thereby effect focus adjustment, and a manual focus mode in which a photographing distance is manually set by the operation of a dial and the photo-taking lens is driven on the basis of the photographing distance, and in such camera, during both modes, the movement of a field frame is effected in operative association with the driving of the photo-taking lens and the correction of the parallax is effected.

In such a prior-art camera, however, during the manual focus mode as well, the movement of the field frame is effected in operative association with the driving of the photo-taking lens, and this has led to a problem that correspondingly to the amount of movement of the field frame, the driving of the photo-taking lens becomes heavy and operability is reduced.

SUMMARY OF THE INVENTION

It is the object of the present invention to provide a parallax correcting apparatus which can change only a field frame by the operation of a manually operated member for manually setting a photographing distance during a manual focus mode.

The parallax correcting apparatus of the present invention, in a camera capable of setting an auto focus mode in which a photo-taking lens is automatically driven on the basis of the result of distance measurement to thereby effect focus adjustment and a manual focus mode in which a photographing distance is manually set by the operation of a manually operated member and the photo-taking lens is driven on the basis of said photographing distance, and provided with parallax correcting means for changing a photographing range in conformity with the photographing distance, is provided with control means for changing said photographing range through said parallax correcting means in operative association with the driving of said photo-taking lens, during said auto focus mode, and changing said photographing range through said parallax correcting means in operative association with only the operation of said manually operated member and without driving the lens, during said manual focus mode.

In the parallax correcting apparatus of the present invention, during the auto focus mode, the display of the photographing range is changed in operative association with the driving of the photo-taking lens, while during the manual focus mode, the display of the photographing range is changed in operative association with only the operation of the manually operated member without the lens being driven.

DESCRIPTION OF THE PREFERRED EMBODIMENTS

Some embodiments of the present invention will hereinafter be described in detail with reference to the drawings.

Figure 1:
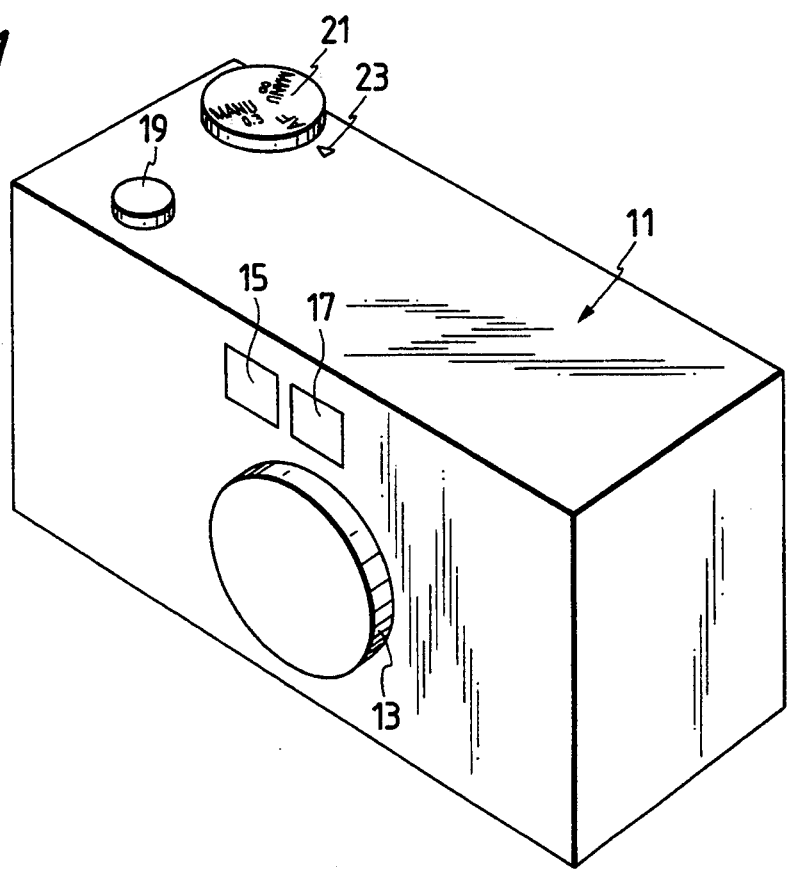
FIG. 1 is a perspective view showing a camera provided with an embodiment of the parallax correcting apparatus of the present invention.

Referring to FIG. 1 which shows a camera provided with an embodiment of the parallax correcting apparatus of the present invention, the reference numeral 11 designates a camera body.

A lens barrel 13 is disposed on the front of the camera body 11, and a finder lighting window 15 and a finder objective window 17 are disposed above the lens barrel 13.

In this embodiment, the finder objective window 17 is located right above the lens barrel 13.

A release button 19 and a dial 21 which is a manually operated member are disposed on the upper surface of the camera body 11.

An index mark 23 is formed laterally of the dial 21 of the camera body 11.

Figure 2:
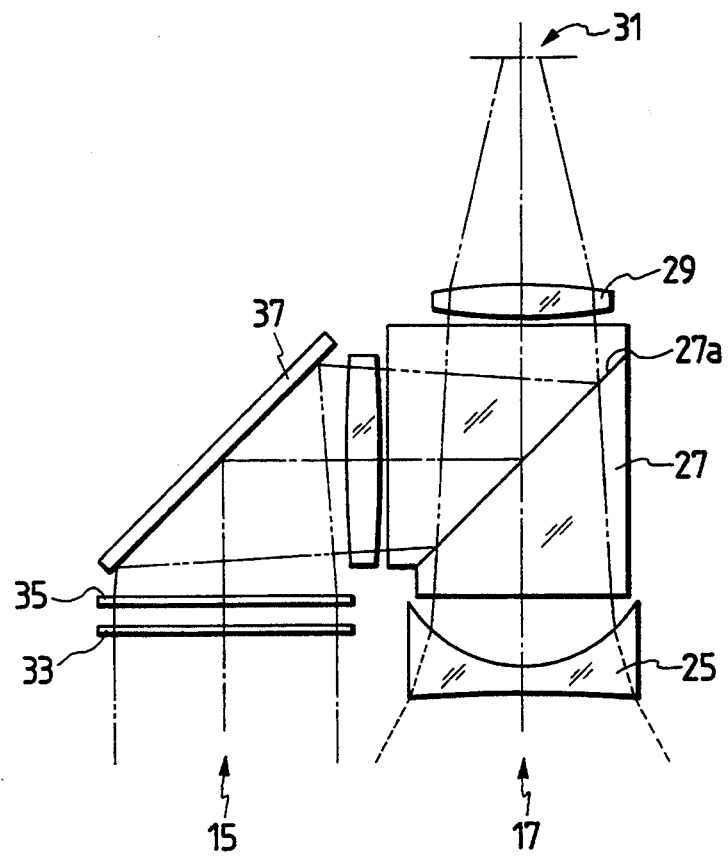
FIG. 2 is an illustration showing the optical path of the finder of FIG. 1.

FIG. 2 shows the details of a finder, and in this embodiment, an optical image frame lighting type reverse Galilean finder is adopted.

That is, object light from the finder objective window 17 passes through an objective lens 25 and a prism 27, and thereafter passes through an eyepiece 29 and is imaged on an eyepiece window 21.

On the other hand, object light from the finder lighting window 15 passes through a fixed frame 33 and a parallax correcting frame 35 which constitute a field frame, whereafter it is reflected by a mirror 37, is further reflected by the translucent surface 27a of the prism 27, passes through the eyepiece 29 and is imaged on the eyepiece window 31.

Figure 3A:
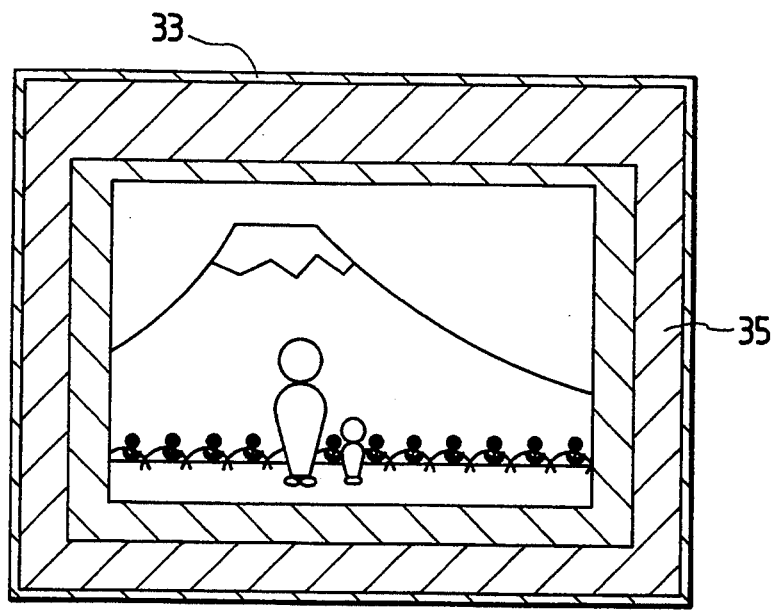
FIGS. 3A and 3B are illustrations showing the parallax correcting state by the parallax correcting apparatus disposed in the camera of FIG. 1.

In this embodiment, the parallax correcting frame 35 is movable by the parallax correcting apparatus which will be described later, and during infinity photographing, as shown in FIG. 3A, the parallax correcting frame 35 completely overlaps the fixed frame 33, and the object light passed through the space in the fixed frame 33 is imaged on the eyepiece window 31.

Figure 3B:
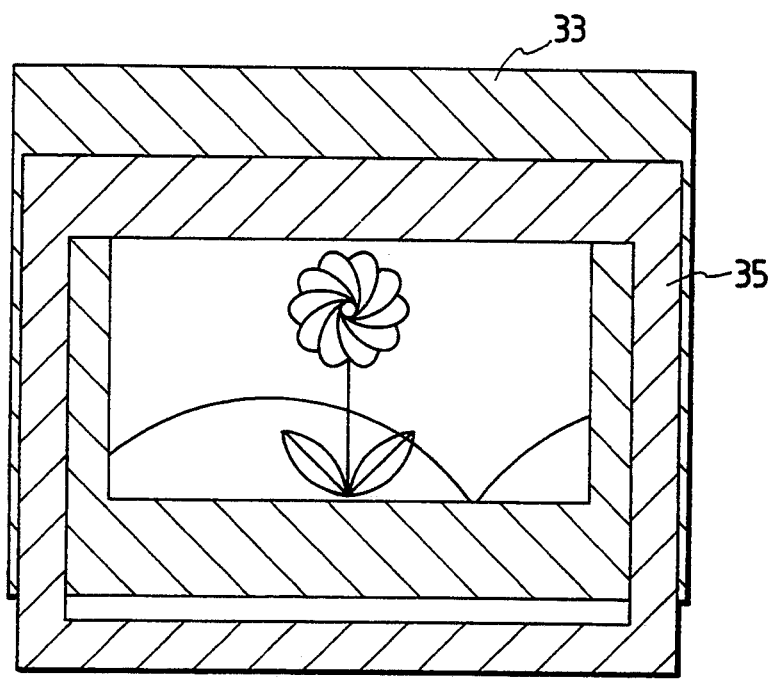

On the other hand, during close-up photographing, as shown in FIG. 3B, the parallax correcting frame 35 is moved downwardly and the upper portion of the space in the fixed frame 33 is shielded from light, and the object light passed through that portion of the space which is not shielded from light is imaged on the eyepiece window 31.

Figure 4:
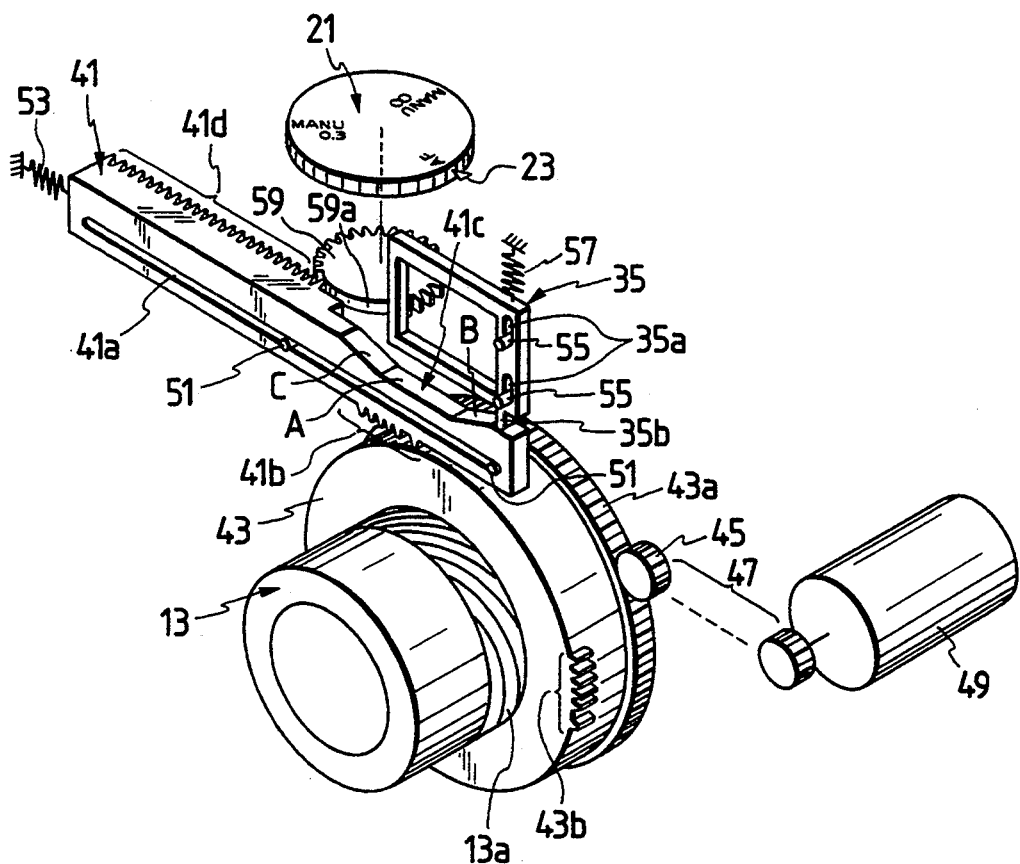
FIG. 4 is a perspective view showing the details of the parallax correcting apparatus of the camera of FIG. 1.

Referring to FIG. 4 which shows the details of the parallax correcting apparatus, the reference numeral 13 denotes the lens barrel.

A correcting frame moving member 41 is disposed above the lens barrel 13, and the parallax correcting frame 35 is disposed above the correcting frame moving member 41.

An outer helicoid 43 is disposed on the rear side of the lens barrel 13, and a gear 45 is in meshing engagement with a gear 43a formed on the rear end of the outer helicoid 43.

This gear 45 is rotated by a motor 49 through a gear train 47.

The lens barrel 13 is designed to be axially moved by a helicoid portion 13a and a rotation preventing member, not shown.

A gear portion 43b is formed only on a portion of the front outer periphery of the outer helicoid 43.

The correcting frame moving member 41 is of an elongate shape, and a guide groove 41a is formed along the vertically central portion thereof.

A guide shaft 51 fixed to the camera body 11 side is inserted in the guide groove 41a, and the correcting frame moving member 41 is movable along the guide shaft 51.

The correcting frame moving member 41 is normally biased leftwardly as viewed in FIG. 4 by a tension spring 53.

A rack portion 41b capable of meshing with the gear portion 43b of the outer helicoid 43 is formed on the underside of the correcting frame moving member 41.

A cam portion 41c is formed on the upper surface of the correcting frame moving member 41, and this cam portion 41c has a flat portion A and inclined surface portions B and C formed on both sides thereof.

The parallax correcting frame 35 is disposed above this cam portion 41c.

A guide groove 35a is vertically formed in one side of the parallax correcting frame 35.

A guide shaft 55 fixed to the camera body 11 side is inserted in the guide groove 35a, and the parallax correcting frame 35 is vertically movable along the guide shaft 55.

The parallax correcting frame 35 is normally biased toward the correcting frame moving member 41 by a compression spring 57.

A follower portion 35b slidable along the cam portion 41c of the correcting frame moving member 41 is formed on one side of the underside of the parallax correcting frame 35.

On the other hand, a rack portion 41d is formed on the rear surface of the correcting frame moving member 41, and a partly untoothed gear 59 rotatable in operative association with the rotation of the dial 21 is disposed rearwardly of this rack portion 41d.

The partly untoothed gear 59 is formed with an untoothed portion 19a and is designed so as not to mesh with the rack portion 41d when the "AF" of the dial 21 is located at the position of the index mark 23.

Figure 5:
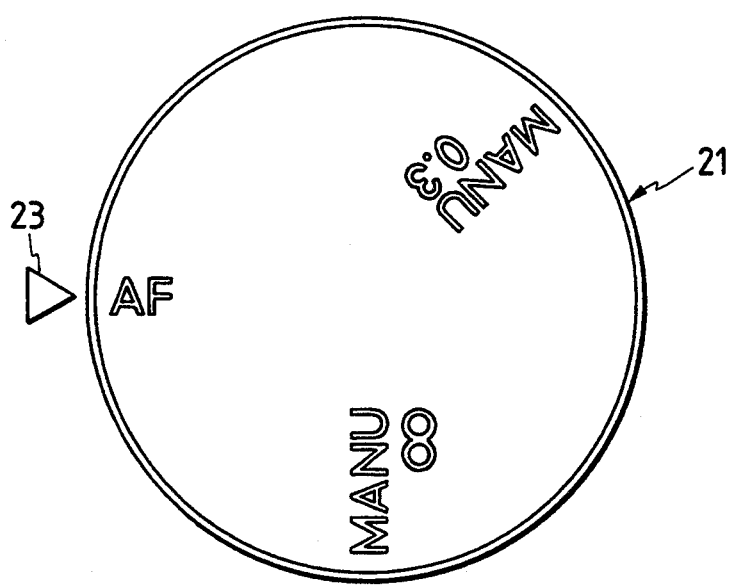
FIG. 5 is a top plan view showing the details of the dial of the camera of FIG. 1.

That is, as shown in FIG. 5, "AF" indicative of an auto focus mode, "MANU ∞" indicative of the infinity side in a manual focus mode and "MANU 0.3" indicative of the close-up side are carved on the dial 21, and when the "AF" of the dial 21 is located at the position of the index mark 23 on the camera body 11, the untoothed portion 59a of the partly untoothed gear 59 is located on the rack portion 41d side so that the partly untoothed gear 59 may not mesh with the rack portion 41d.

In the parallax correcting apparatus constructed as described above, the parallax correction during the auto focus mode is effected in the manner described below.

During the auto focus mode, the "AF" of the dial 21 is located at the position of the index mark 23 on the camera body 11 so that the partly untoothed gear 59 may not mesh with the rack portion 41d.

First, it is to be understood that as the initial state, the focus is at the infinity position.

Figure 6:
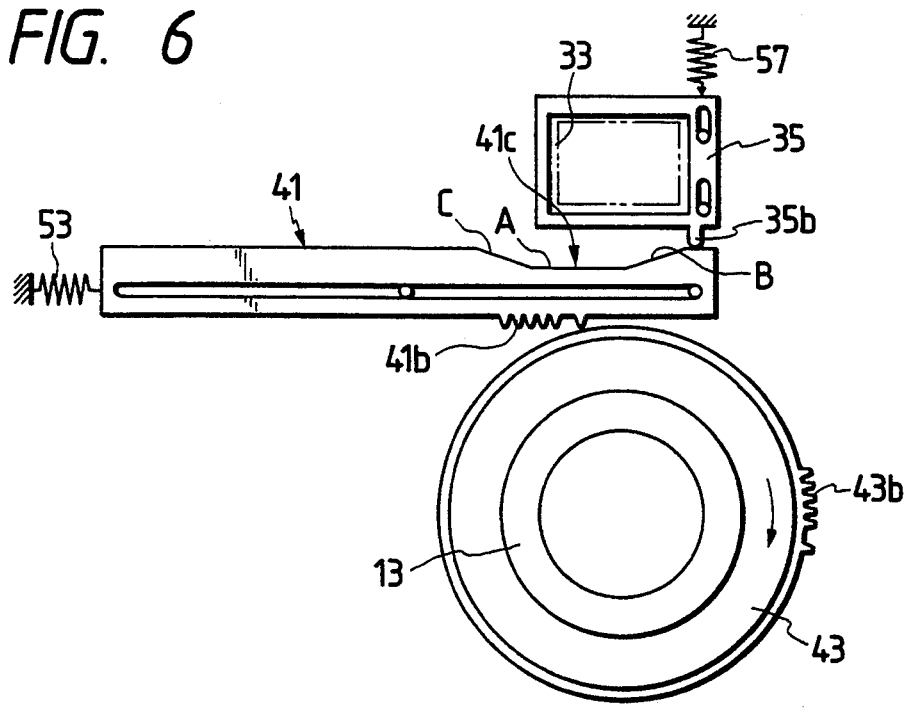
FIG. 6 is a front view showing the state in the parallax correcting apparatus of FIG. 4 when the camera is in an auto focus mode and the photographing distance is an infinity position.

At this time, as shown in FIG. 6, the gear portion 43b of the outer helicoid 43 is not in meshing engagement with the rack portion 41d of the correcting frame moving member 41 and the follower portion 35b of the parallax correcting frame 35 is located at the right end of the correcting frame moving member 41.

Figure 7:
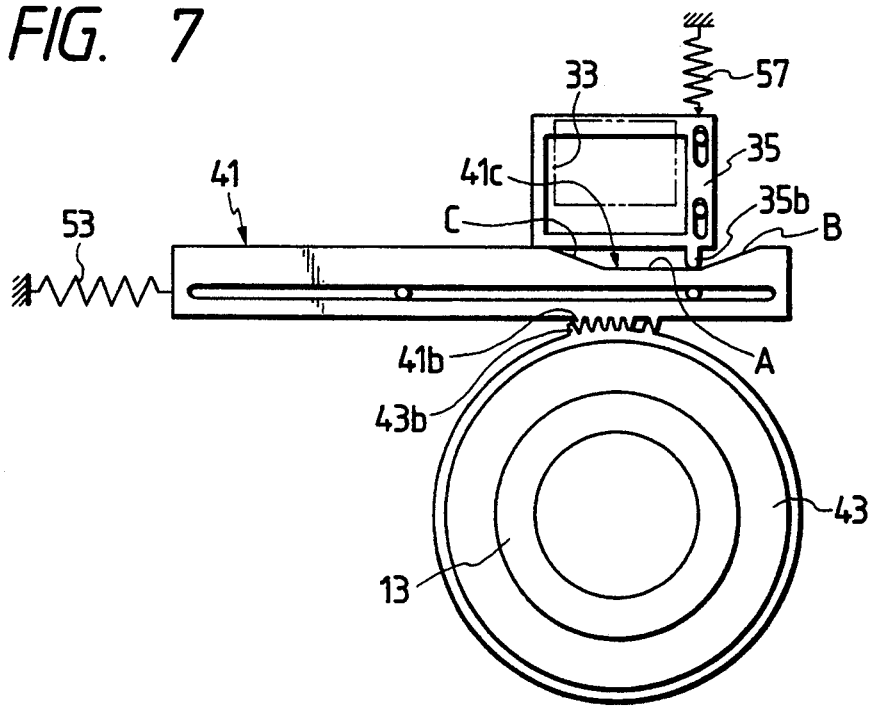
FIG. 7 is a front view showing the state in the parallax correcting apparatus of FIG. 4 when the camera is in the auto focus mode and the photographing distance is a close distance position.

When the release button 19 is half-depressed from this state, the object position is distance-measured, and when the object position is on the close-up side the motor 49 is rotated, whereby the outer helicoid 43 is rotated in the direction of arrow in FIG. 6, and when the outer helicoid 43 is rotated by a predetermined amount, the gear portion 43b of the outer helicoid 43 comes into meshing engagement with the rack portion 41b of the correcting frame moving member 41, and at the closest photographing distance, there is brought about a state as shown in FIG. 7.

That is, when the gear portion 43b of the outer helicoid 43 comes into meshing engagement with the rack portion 41b of the correcting frame moving member 41, the correcting frame moving member 41 is moved rightwardly against the tensile force of the tension spring 53, and the follower portion 35b of the parallax correcting frame 35 is lowered along the inclined surface portion B of the cam portion 41c by the biasing force of the compression spring 57, whereby the parallax correcting frame 35 is moved downwardly relative to the fixed frame 33 and thus, parallax correction is effected.

On the other hand, the parallax correction during the manual focus mode is effected in the manner described below.

During the manual focus mode, "MANU ∞" and "MANU 0.3" of the dial 21 or the portion between these is located at the position of the index mark 23 on the camera body 11 side and the partly untoothed gear 59 is in meshing engagement with the rack portion 41d.

First, it is to be understood that as the initial state, "MANU 0.3" of the dial 21 is located at the position of the index mark 23 on the camera body 11 side.

Figure 8:
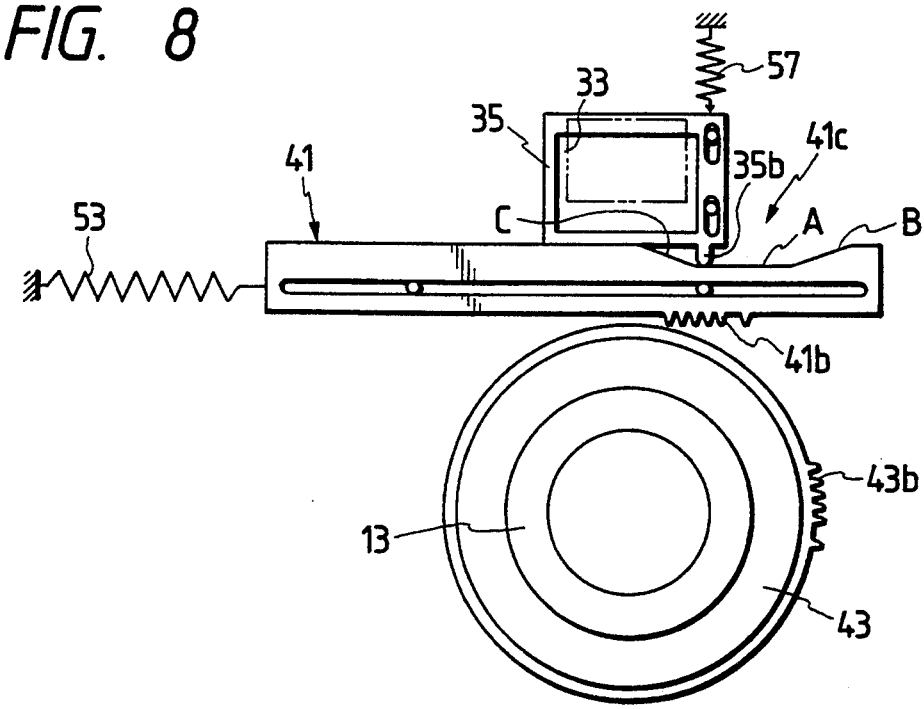
FIG. 8 is a front view showing the state in the parallax correcting apparatus of FIG. 4 when the camera is in a manual focus mode and the photographing distance is the close distance position.

At this time, in operative association with the operation of locating "MANU 0.3" of the dial 21, instead of "AF", at the position of the index mark 23 on the camera body 11 side, the partly untoothed gear 59 meshing with the rack portion 41d of the correcting frame moving member 41 is rotated and as shown in FIG. 8, the correcting frame moving member 41 is moved rightwardly against the tensile force of the tension spring 53, the follower portion 35b of the parallax correcting frame 35 is located at the left end of the flat portion A of the cam portion 41c of the correcting frame moving member 41, and the parallax correcting frame 35 is moved downwardly relative to the fixed frame 33, whereby parallax correction for the closest photographing distance is effected.

In this state, the correcting frame moving member 41 is moved rightwardly and therefore, even if the gear portion 43b of the outer helicoid 43 is rotated to the closest position, it will not mesh with the rack portion 41b.

Figure 9:
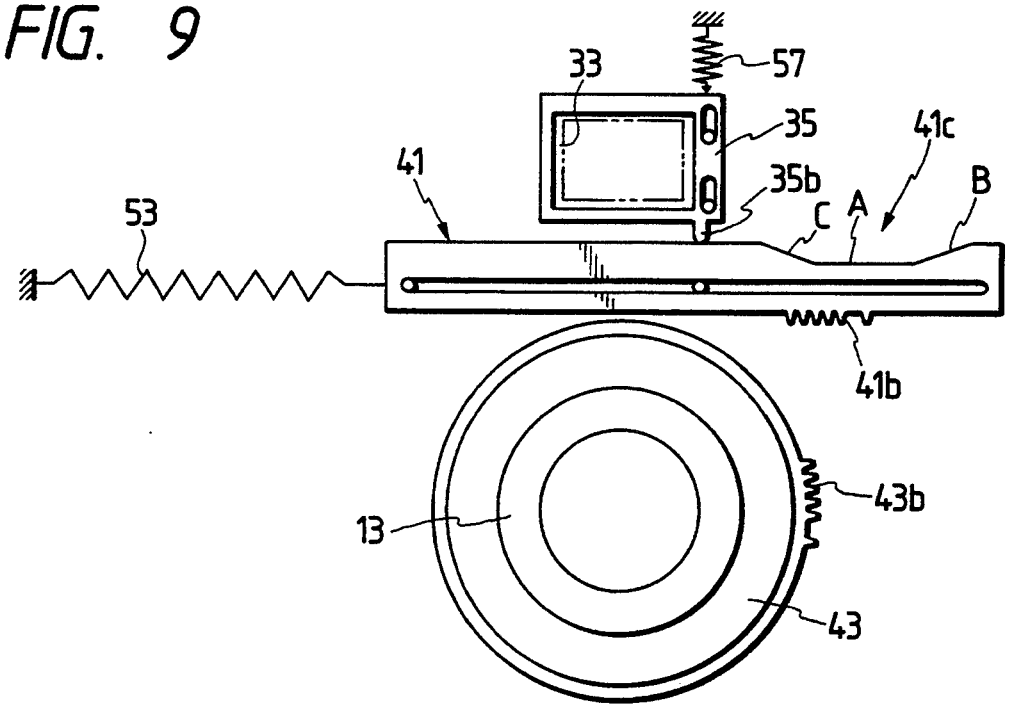
FIG. 9 is a front view showing the state in the parallax correcting apparatus of FIG. 4 when the camera is in the manual focus mode and the photographing distance is the infinity position.

When from this state, the dial 21 is turned so that "MANU ∞" of the dial 21 may be located at the position of the index mark 23 on the camera body 11 side, the correcting frame moving member 41 is further moved rightwardly as viewed in FIG. 8, and the follower portion 35b of the parallax correcting frame 35 is elevated along the inclined surface portion C of the cam portion 41c of the correcting frame moving member 41 by the biasing force of the compression spring 57 and the parallax correcting frame 35 is moved upwardly relative to the fixed frame 33 and thus, the amount of parallax correction is alleviated and at the infinity position, there is brought about a state as shown in FIG. 9.

In this embodiment, again during the manual focus mode, as during the auto focus mode, the axial movement of the lens barrel 13 is effected by the half depression of the release button 19.

Thus, in the above-described parallax correcting apparatus, during the manual focus mode, only the parallax correcting frame 35 is moved in operative association with the operation of the dial 21 and therefore, it never happens that during the manual focus mode, the driving of the lens barrel 13 becomes heavy, and the operability of the camera can be improved.

Further, in this embodiment, an actuator for exclusive use or the like is not used, but the parallax correcting frame 35 is directly moved by the operation of the dial 21 for setting the photographing distance and therefore, any increase in manufacturing costs can be suppressed.

Now, the above-described embodiment is one in which the amount of parallax correction is indicated by moving the field frame, while another embodiment which will now be described is one in which field frames provided in the finder and each comprising an LCD or an electro-optical element are turned on to thereby indicate the amount of parallax correction.

Figure 10:
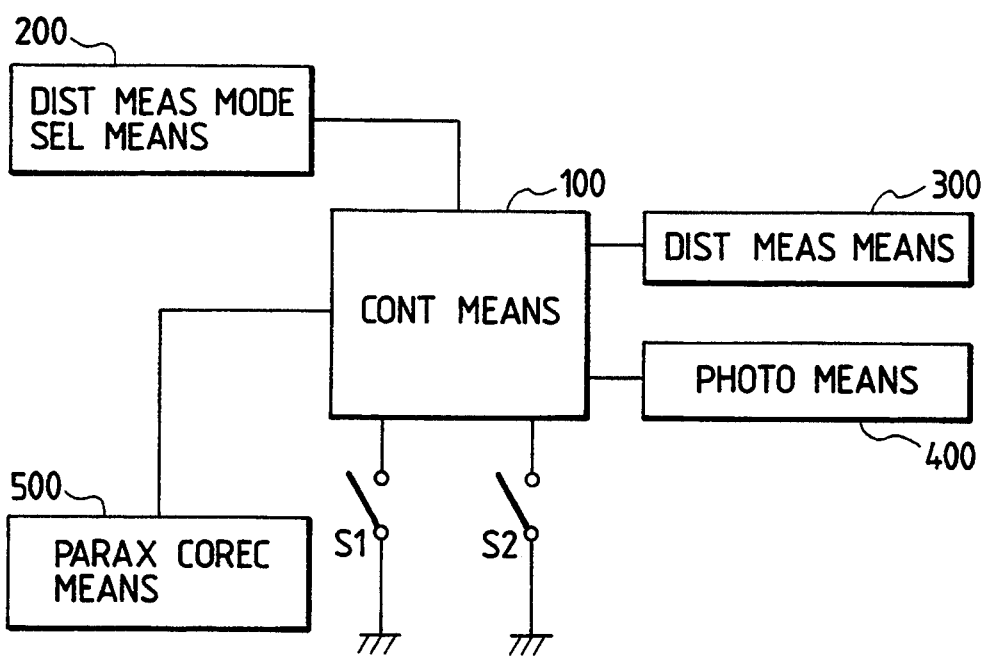
FIG. 10 is a block diagram showing another embodiment of the parallax correcting apparatus of the present invention.

FIG. 10 is a block diagram of another embodiment of the parallax correcting apparatus of the present invention.

In FIG. 10, a half depression switch S1 and a full depression switch S2 are connected to control means 100.

These switches S1 and S2 are switches operatively associated with the depressing operation of the release button 19 shown in FIG. 1, and when the release button 19 is half-depressed, the half depression switch S1 is closed, and when the release button 19 is fully depressed, the full depression switch S2 is closed.

Distance measuring mode selecting means 200, distance measuring means 300, photographing means 400 and parallax correcting means 500 are further connected to the control means 100. These will be described in succession.

The distance measuring mode selecting means 200 sets one of the auto focus mode (hereinafter referred to as the AF mode) and the manual focus mode (hereinafter referred to as the MF mode) on the basis of the operation of the dial 21 shown in FIG. 1.

The distance measuring means 300 calculates distance measurement information corresponding to the distance to an object when the AF mode is set, and outputs the distance measurement information to the control means 100.

The photographing means 400 calculates the amount of movement of the photo-taking lens on the basis of the distance measurement information calculated by the distance measuring means 300 when the AF mode is set, and moves the photo-taking lens by the calculated amount of movement to thereby effect focusing and also drives an exposure control member such as a stop or a shutter to thereby effect photographing.

On the other hand, when the MF mode is set, on the basis of a set value (here, 0.3, 2.0 or ∞) selected by the operation of the dial 21, the photographing means 400 moves the photo-taking lens to a position corresponding to the set value and also drives the exposure control member such as the stop or the shutter to thereby effect photographing.

The parallax correcting means 500 indicates the amount of parallax correction on the basis of the distance measurement information calculated by the distance measuring means 300 when the AF mode is set, and indicates the amount of parallax correction on the basis of the set value selected by the operation of the dial 21 when the MF mode is set.

Figure 11:
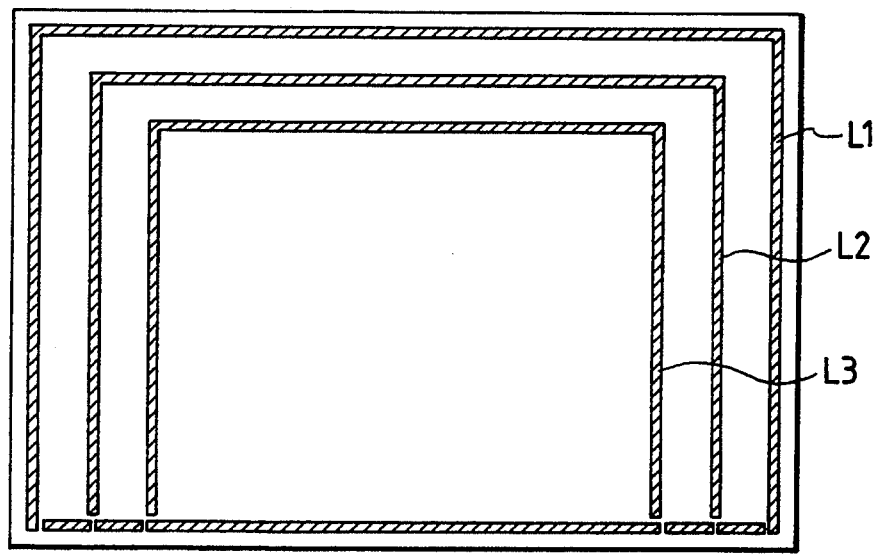
FIG. 11 is an illustration showing a field frame constituting the parallax correcting means of FIG. 10.

The indication of the amount of parallax correction is effected by turning off field frames L1-L3 each comprising an LCD or an electro-optical element provided in the finder as shown in FIG. 11.

In that case, if the distance to the object is infinity, the field frame L1 will be turned on, whereby the photographing range thereof will be indicated, and if the distance to the object is a short distance, the field frame L3 will be turned on, whereby the photographing range thereof will be indicated.

Also, if the distance to the object is a medium distance which belongs to neither of infinity and the short distance, the field frame L2 will be turned on.

Figure 12:
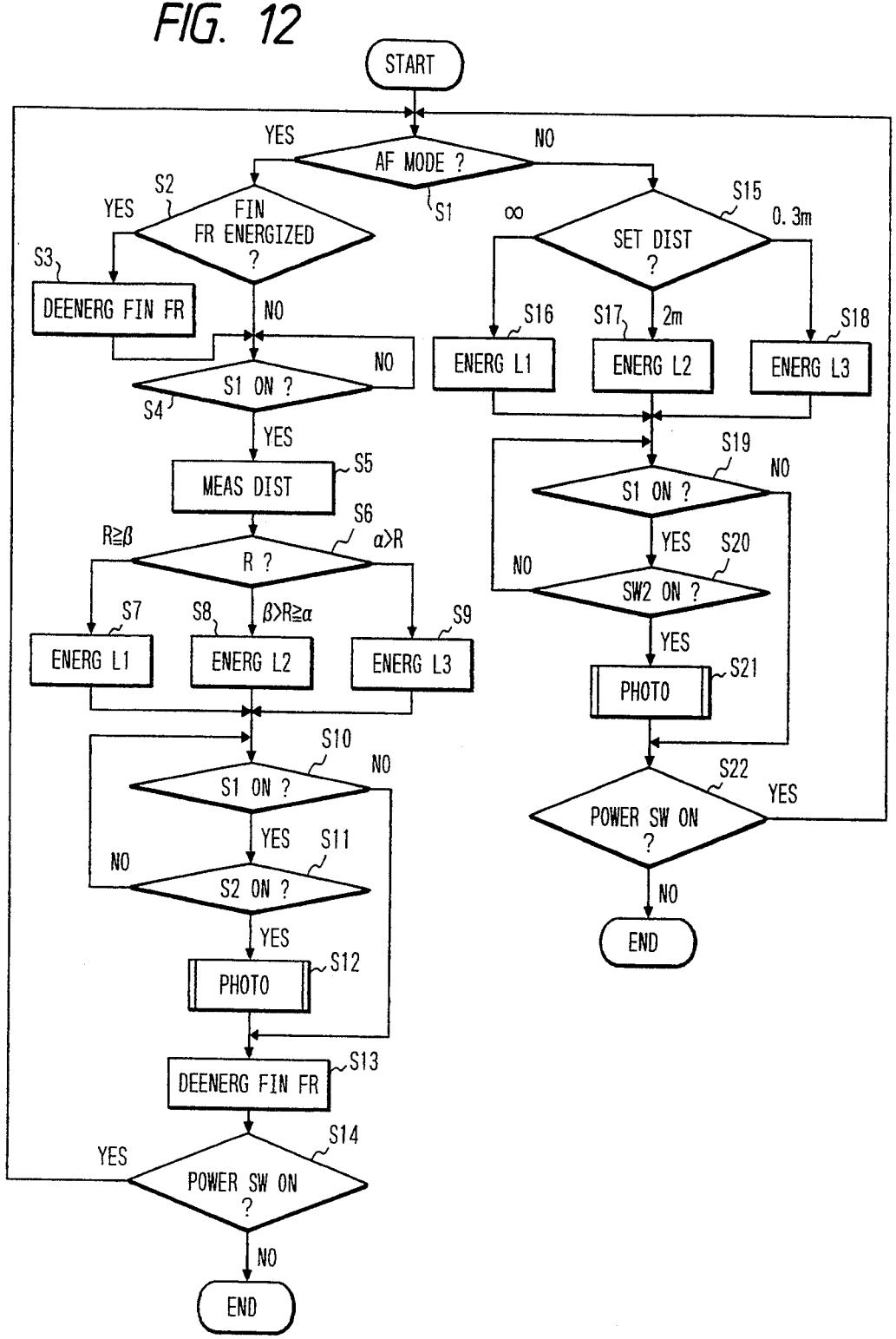
FIG. 12 is a flow chart for illustrating the operation of the parallax correcting apparatus of FIG. 10.

The parallax correcting apparatus constructed as described above operates as follows. This will now be described with reference to the flow chart of FIG. 12.

The flow is started by a power switch, not shown, being closed.

Whether the distance measuring mode is the AF mode is first discriminated (step S1). This discrimination is done by seeing the set state of the dial 21. If the distance measuring mode is the AF mode, advance is made to a step S2, and if the distance measuring mode is the MF mode, advance is made to a step S15.

The operation in the AF mode will hereinafter be described in detail.

Whether one of the field frames L1-L3 is turned on is first discriminated (step S2).

If one of these field frames is turned on, advance is made to a step S3, and if none of them is turned on, advance is made to a step S4.

At the step S3, one of the field frames L1-L3 is turned off and advance is made to a step S4.

At the step S4, whether the half depression switch S1 is ON is discriminated. If this switch S1 is ON, advance is made to a step S5, and if this switch S1 is OFF, whether the half depression switch S1 is ON is repetitively discriminated.

At the step S5, distance measurement information corresponding to the distance to the object is calculated by the distance measuring means 300, and advance is made to a step S6. Specific means for this is a well-known technique and therefore need not be described.

At the step S6, to which of the following values the distance measurement information calculated at the step S5 corresponds is discriminated. That is, if the distance to the object is R and R corresponds to a value equal to or greater than $\beta$ (3 m), advance is made to a step S7 with this as the infinity distance, and if R corresponds to a value greater than $\alpha$ (0.3 m) and less than $\beta$ (3 m), advance is made to a step S8 with this as a medium distance, and if R corresponds to a value less than $\alpha$ (0.3 m), advance is made to a step S9 with this as a short distance.

At the step S7, the field frame L1 is turned on under the control of the parallax correcting means 500.

At the step S8, the field frame L2 is turned on under the control of the parallax correcting means 500.

Further, at the step S9, the field frame L3 is turned on under the control of the parallax correcting means 500.

At a step S10, whether the half depression switch S1 is ON is discriminated. If this switch S1 is ON, advance is made to a step S11, and if this switch S1 is OFF, advance is made to a step S13.

At the step S11, whether the full depression switch S2 is ON is discriminated. If this switch S2 is ON, advance is made to a step S12, and if this switch S2 is OFF, return is made to the step S10.

At the step S12, the amount of movement of the photo-taking lens is calculated under the control of the photographing means 400 on the basis of the distance measurement information calculated by the distance measuring means 200, and the photo-taking lens is moved by the calculated amount of movement to thereby effect focusing and also the exposure control member such as the stop or the shutter is driven to thereby effect photographing. Thereafter, the process proceeds to a step S13.

At the step S13, one of the field frames L1-L3 is turned off, and advance is made to a step S14.

At the step S14, whether the power switch, not shown, is ON is discriminated. If the power switch is ON, return is made to the step S1, and if the power switch is OFF, the process is terminated.

As described above, in the parallax correcting apparatus of this embodiment, when the AF mode is set, one of the field frames is turned on on the basis of the distance measurement information calculated by the distance measuring means 300, in accordance with the closing of the half depression switch S1, whereby the amount of parallax correction is indicated.

Accordingly, the distance measuring operation is performed upon the half depression of the release button and on the basis of the result thereof, the amount of parallax correction is indicated, and this leads to the advantage that the framing during photographing becomes easy.

Now, when at the step S1, a negative result is obtained, that is, when it is discriminated that the distance measuring mode is not the AF mode but the MF mode, advance is made to a step S15.

The operation in the MF mode will hereinafter be described in detail.

Which of 0.3 m, 2.0 m and $\infty$ the set value selected by the operation of the dial 21 is is first discriminated (step S15). If the set value is $\infty$, advance is made to a step S16, and if the set value is 2.0 m, advance is made to a step S17, and if the set value is 0.3 m, advance is made to a step S18. In operative association with the operation of the dial 21, the photo-taking lens is driven on the basis of the selected set value.

At the step S16, the field frame L1 is turned on under the control of the parallax correcting means 500.

At the step S17, the field frame L2 is turned on under the control of the parallax correcting means 500.

Further, at the step S18, the field frame L3 is turned on under the control of the parallax correcting means 500.

At a step S19, whether the half depression switch S1 is ON is discriminated. If this switch S1 is ON, advance is made to a step S20, and if this switch S1 is OFF, advance is made to a step S22.

At the step S20, whether the full depression switch S2 is ON is discriminated. If this switch S2 is ON, advance is made to a step S21, and if this switch S2 is OFF, return is made to the step S19.

At the step S21, the exposure control member such as the stop or the shutter is driven to thereby effect photographing. Thereafter, the process proceeds to the step S22.

At the step S22, whether the power switch, not shown, is ON is discriminated. If the power switch is ON, return is made to the step S1, and if the power switch is OFF, the process is terminated.

As described above, in the parallax correcting apparatus of this embodiment, when the MF mode is set, the lens is driven on the basis of the set value selected by the operation of the dial 21 without waiting for the closing of the half depression switch S1 and also, one of the field frames is turned on, whereby the amount of parallax correction is indicated. This leads to the advantage that before the half depression of the release button, a proper field frame can be recognized on real time.

As described above, in the parallax correcting apparatus of the present invention, during the manual focus mode, only the field frame is changed in operative association with the operation of the manually operated member, and this leads to the advantage that during the manual focus mode, parallax correction can be accomplished without the photo-taking lens being driven.

What is claimed is:

1. A parallax correcting apparatus in a camera provided with an auto focus mode in which a photo-taking lens is automatically driven on the basis of the result of distance measurement to thereby effect focus adjustment and a manual focus mode in which a photographing distance is manually set by the operation of a manually operated member and the photo-taking lens is driven on the basis of said photographing distance, comprising:
   display means for displaying said photographing range; and
   parallax correcting means for changing the display of said photographing range on the basis of the photographing distance;
   wherein during said auto focus mode, said parallax correcting means changes the display of said photographing range in operative association with the driving of said photo-taking lens, and
   during said manual focus mode, said parallax correcting means changes the display of said photographing range in operative association with the operation of said manually operated member independently of the driving of said photo-taking lens.

2. The parallax correcting apparatus of claim 1, wherein said display means comprises a field frame provided in the finder of the camera and movable on the basis of the photographing range changed by said parallax correcting means.

3. The parallax correcting apparatus of claim 1, wherein said display means comprises a field frame including an electro-optical element provided in the finder of the camera and capable of being turned on on the basis of the photographing range changed by said parallax correcting means.

4. A parallax correcting apparatus in a camera provided with an auto focus mode in which a photo-taking lens is automatically driven on the basis of the result of distance measurement to thereby effect focus adjustment and a manual focus mode in which a photographing distance is manually set by the operation of a manually operated member and the photo-taking lens is driven on the basis of said photographing distance comprising:
   a display device for displaying said photographing range; and
   a parallax correcting device for changing the display of said photographing range on the basis of the photographing distance;
   wherein during said auto focus mode, said parallax correcting device changes the display of said photographing range in operative association with the driving of said photo-taking lens, and
   during said manual focus mode, said parallax correcting device changes the display of said photographing range in operative association with the operation of said manually operated member independently of the driving of said photo-taking lens.

5. The parallax correcting apparatus of claim 4, wherein said display device comprises a field frame provided in the finder of the camera and movable on the basis of the photographing range changed by said parallax correcting device.

6. The parallax correcting apparatus of claim 4, wherein said display device comprises a field frame including an electro-optical element provided in the finder of the camera and capable of being turned on on the basis of the photographing range changed by said parallax correcting device.

* * * * *